United States Patent
Yang et al.

(10) Patent No.: US 9,843,410 B2
(45) Date of Patent: Dec. 12, 2017

(54) LOW-NOISE OPTICAL PHASE SENSITIVE AMPLIFIER USING A SEMICONDUCTOR NONLINEAR OPTICAL DEVICE

(71) Applicant: Fujitsu Limited, Kawasaki-shi, Kanagawa (JP)

(72) Inventors: Jeng-Yuan Yang, Garland, TX (US);
Inwoong Kim, Allen, TX (US);
Youichi Akasaka, Allen, TX (US);
Motoyoshi Sekiya, Richardson, TX (US)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 14/944,455

(22) Filed: Nov. 18, 2015

(65) Prior Publication Data
US 2017/0141871 A1  May 18, 2017

(51) Int. Cl.
*H04J 14/02* (2006.01)
*H04J 14/06* (2006.01)
*H04B 10/564* (2013.01)

(52) U.S. Cl.
CPC ........ *H04J 14/0221* (2013.01); *H04B 10/564* (2013.01); *H04J 14/06* (2013.01)

(58) Field of Classification Search
CPC ............ H04B 10/2971; H04B 10/2972; H04B 10/299; H04B 10/564; H04J 14/0221
See application file for complete search history.

(56) References Cited

U.S. PATENT DOCUMENTS

| | | | |
|---|---|---|---|
| 2005/0063425 A1* | 3/2005 | Krastev | H04L 7/0075 372/6 |
| 2009/0196619 A1* | 8/2009 | Kim | H04B 10/60 398/92 |
| 2014/0043674 A1* | 2/2014 | Takasaka | H04B 10/294 359/334 |
| 2015/0036210 A1* | 2/2015 | Asobe | G02F 1/39 359/341.3 |
| 2016/0172818 A1* | 6/2016 | Takasaka | H04B 10/294 359/330 |

* cited by examiner

*Primary Examiner* — Dzung Tran
(74) *Attorney, Agent, or Firm* — Baker Botts L.L.P.

(57) ABSTRACT

Methods and systems for amplifying optical signals include generating idler signals for input signals using an optical pump at a first Bragg reflection waveguide (BRW) having second order optical nonlinearity. Phase and amplitude regulation is performed using the output from the first BRW. Optical power monitoring of the input signals may be used for power equalization. The phase-sensitive amplified signal is generated at a second BRW using the optical pump. Optical power monitoring of the input signals may be used for power equalization.

19 Claims, 10 Drawing Sheets

LOW-NOISE OPTICAL PHASE SENSITIVE AMPLIFIER USING A SEMICONDUCTOR NONLINEAR OPTICAL DEVICE

BACKGROUND

Field of the Disclosure

The present disclosure relates generally to optical communication networks and, more particularly, to a low-noise optical phase sensitive amplifier using a semiconductor nonlinear optical device.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

In PSK, the information carried by the optical signal may be conveyed by modulating the phase of a reference signal, also known as a carrier wave. The information may be conveyed by modulating the phase of the signal itself using differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK" or 2-PSK) using two phases at 0° and 180° (or 0 and π) on the constellation diagram; or quadrature PSK (QPSK, 4-PSK, or 4-QAM) using four phases at 0°, 90°, 180°, and 270° (or 0, π/2, π, and 3π/2). Phases in such signals may be offset. Each of 2-PSK and 4-PSK signals may be arranged on the constellation diagram.

M-PSK signals may further be polarized using techniques such as dual-polarization QPSK (DP-QPSK), wherein separate m-PSK signals are multiplexed by orthogonally polarizing the signals. M-QAM signals may also be polarized using techniques such as dual-polarization 16-QAM (DP-16-QAM), wherein separate m-QAM signals are multiplexed by orthogonally polarizing the signals.

Optical networks may also include various optical elements, such as amplifiers, dispersion compensators, multiplexer/demultiplexer filters, wavelength selective switches, optical switches, couplers, etc. to perform various operations within the network. In particular, optical networks may include costly optical-electrical-optical (O-E-O) regeneration at reconfigurable optical add-drop multiplexers (ROADMs) when the reach of an optical signal is limited in a single optical path.

As data rates for optical networks continue to increase, reaching up to 1 terabit/s (1 T), the demands on optical signal-to-noise ratios (OSNR) also increase, for example, due to the use of advanced modulation formats, such as QAM and PSK with dual polarizations. In particular, noise accumulations resulting from cascading of optical amplifiers in an optical network operating at very high data rates may limit the reach of an optical signal at a desired level of OSNR and may result in an increased number of O-E-O regenerations, which is economically disadvantageous.

SUMMARY

In one aspect, a disclosed method is for amplifying optical signals using Bragg reflection waveguides (BRWs). The method may include receiving a first optical signal for amplification, generating a second optical signal including an optical pump and the first optical signal; and transmitting the second optical signal through a first BRW having second order optical nonlinearity to generate a third optical signal. In the method, the third optical signal may include an idler signal. The method includes transmitting the fourth optical signal through a second BRW having second order optical nonlinearity to perform phase-sensitive amplification resulting in a fourth optical signal.

In any of the disclosed embodiments of the method, the first optical signal may include a plurality of wavelength channels that are wavelength division multiplexed. In any of the disclosed embodiments of the method, each of the wavelength channels may be modulated using orthogonal dual-polarization modulation including an X-polarization component and a Y-polarization component.

In any of the disclosed embodiments of the method, the wavelength channels may be modulated using at least one of: phase-shift keying (PSK); frequency-shift keying (FSK); amplitude-shift keying (ASK); and quadrature amplitude modulation (QAM).

In any of the disclosed embodiments of the method, optical pump, the first BRW, and the second BRW may be included in an integrated semiconductor device.

In any of the disclosed embodiments, the method may further include performing wavelength-selective processing on the fourth optical signal to generate an output optical signal that does not include the optical pump and the idler signal. In any of the disclosed embodiments of the method, performing the wavelength-selective processing may further include attenuating a power level for at least one of the wavelength channels in the fourth optical signal.

In another aspect, an optical amplifier using BRWs is disclosed. The optical amplifier may include a pump source to generate an optical pump, a coupler to combine the optical pump with a first optical signal to generate a second optical signal, and a first non-linear element (NLE) stage to generate a third optical signal from the second optical signal, the third optical signal including an idler signal, the first NLE stage including a first BRW having second order optical nonlinearity. The optical amplifier may further include a second NLE stage to generate a fourth optical signal from the third optical signal, the second NLE stage performing phase-sensitive amplification on the third optical signal and including a second BRW having second order optical nonlinearity.

In any of the disclosed embodiments of the optical amplifier, the first optical signal may include a plurality of wavelength channels that are wavelength division multiplexed. In any of the disclosed embodiments of the optical amplifier, each of the wavelength channels may be modulated using orthogonal dual-polarization modulation including an X-polarization component and a Y-polarization component. In any of the disclosed embodiments of the optical amplifier, the wavelength channels may be modulated using at least one of: phase-shift keying (PSK); frequency-shift keying (FSK); amplitude-shift keying (ASK); and quadrature amplitude modulation (QAM).

In any of the disclosed embodiments of the optical amplifier, the optical pump, the first BRW, and the second BRW may be included in an integrated semiconductor device.

In any of the disclosed embodiments, the optical amplifier may further include a wavelength-specific processing element to perform wavelength-selective processing on the fourth optical signal to generate an output optical signal that does not include the optical pump and the idler signal, the wavelength-specific processing including enabling attenuation of a power level for at least one of the wavelength channels in the fourth optical signal.

Additional disclosed aspects for low noise phase-sensitive optical amplification include an optical communication system including the optical amplifier, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
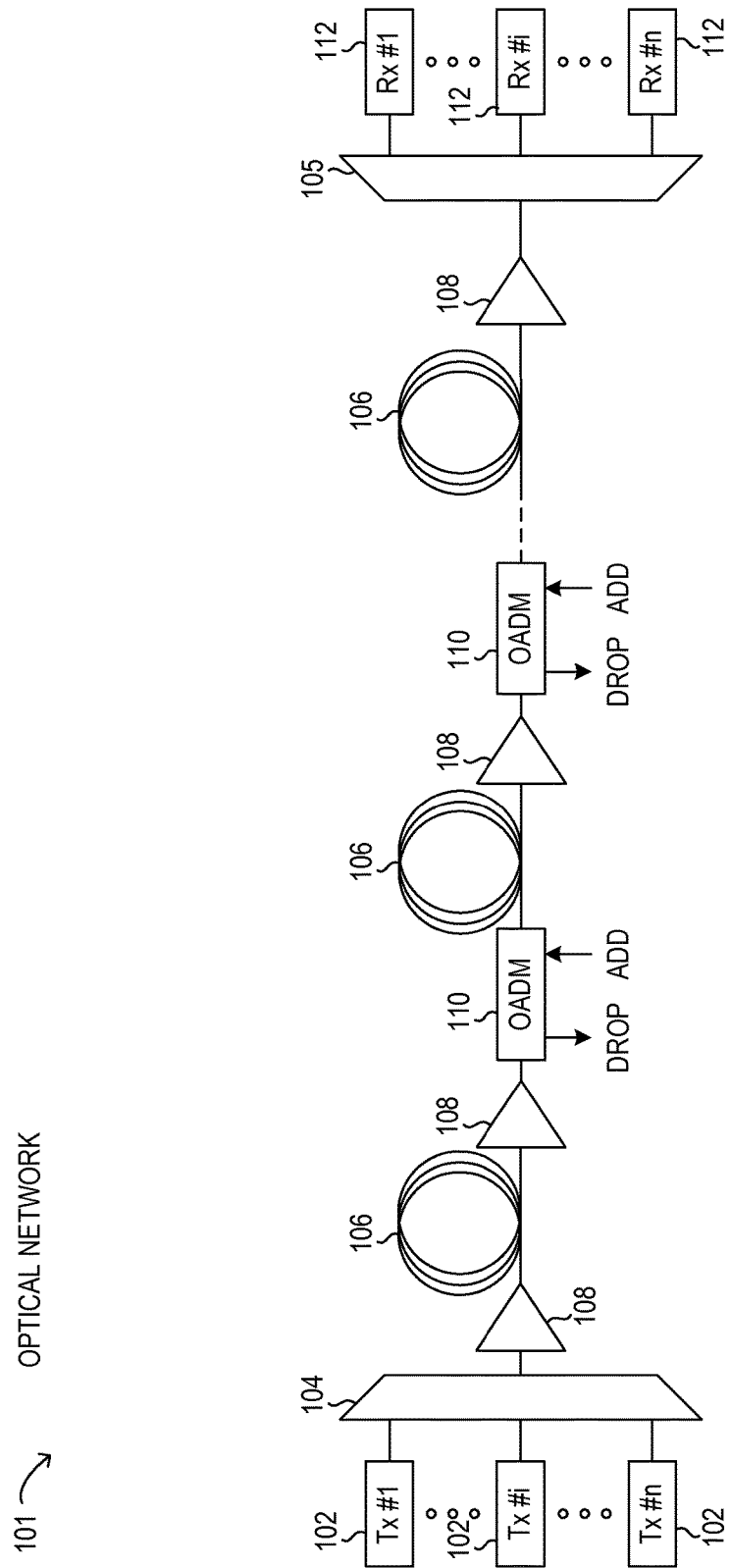
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before and/or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and/or drop optical signals (i.e., at individual wavelengths) from fibers 106. After passing through an OADM 110, an optical signal may travel along fibers 106 directly to a destination, or the signal may be passed through one or more additional OADMs 110 and/or optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and/or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

In operation of optical network 101, as data rates approach 1 T a correspondingly high OSNR becomes desirable to maintain economic feasibility by avoiding excessive numbers of O-E-O regenerators. One source of OSNR reduction is the noise accumulation resulting from cascaded optical amplifiers 108 at various points in the transmission path. For an optical amplifier, OSNR may be represented as a noise figure (NF), given by Equation 1, where $OSNR_{in}$ is the input OSNR, $OSNR_{out}$ is the output OSNR, and dB is decibels.

$$NF = 10 \log(OSNR_{in}/OSNR_{out}) = OSNR_{in} [dB] - OSNR_{out} [dB] \quad \text{Equation (1)}$$

As discussed above, optical amplifiers 108 are used to increase optical power of optical signals in an optical network. Current designs for optical amplifiers may have limitations in noise reduction capability. For example, EDFAs may be limited to a noise figure of about NF≥3 dB. Raman amplifiers may have a smaller noise figure, but may carry a risk of fiber fusion that can burn an entire fiber link. Phase-insensitive optical parametric amplifiers may experience a quantum limit of the noise figure given by NF=3 dB.

Current optical nonlinear devices used for phase-sensitive amplification include highly-nonlinear fiber (HLNF), and certain crystalline waveguides, such as periodically-poled lithium niobate (PPLN). Such conventional optical nonlinear devices may be associated with certain optical performance and operational limitations (stimulated Brillouin scattering (SBS) suppression, temperature stabilization) and may be fundamentally limited by size for physical integration into miniature platforms.

As will be described in further detail, a Bragg reflection waveguide (BRW), which has second order nonlinearity, may be used for parametric amplification of an optical signal. Furthermore, an optical pump (also referred to simply as 'pump' herein) for parametric amplification may be generated within the BRW by inducing lasing at a pump frequency using current injection. Because the BRW is a solid state semiconductor element having second order optical nonlinearity, many elements of an optical amplifier using the BRW for optical parametric amplification (OPA) may be consolidated into a single semiconductor platform, which is desirable for performance, low NF, and economic reasons.

Methods and systems are disclosed herein for a phase-sensitive optical amplifier (PSA) that enables parametric amplification using a BRW. The optical gain of a BRW can be controlled using various methods. For example, non-stoichiometric aluminum gallium arsenide $Al_xGa_{1-x}As$ has been used for Bragg reflector layers in a BRW. By applying band gap engineering, the stoichiometric value for x may be used to design a particular gain frequency in a BRW. In this manner, a BRW may be used to amplify an optical signal by phase-sensitive amplification.

The low noise phase-sensitive optical amplifier (PSA) using BRWs described herein may provide for a lower noise figure than previous optical amplifier designs. The low noise PSA using BRWs disclosed herein may provide full compensation for signal impairments, such as chromatic dispersion (CD) and polarization mode dispersion (PMD), on all amplified channels. The low noise PSA using BRWs disclosed herein may further monitor signal quality of WDM input channels. The low noise PSA using BRWs disclosed herein may also stabilize the phase for each amplified channel and idler conjugate pair. The low noise PSA using BRWs disclosed herein may still further achieve low-noise optical amplification on input channels employing orthogonal polarizations. The low noise PSA using BRWs disclosed herein may also achieve polarization-insensitive low-noise amplification. The low noise PSA using BRWs disclosed herein may still further provide sufficient optical bandwidth and flexible hardware to accommodate various changes in the number and configuration of the input optical channels. The low noise PSA using BRWs disclosed herein may be miniaturized and integrated, at least in part, on a single semiconductor device platform.

Figure 2:
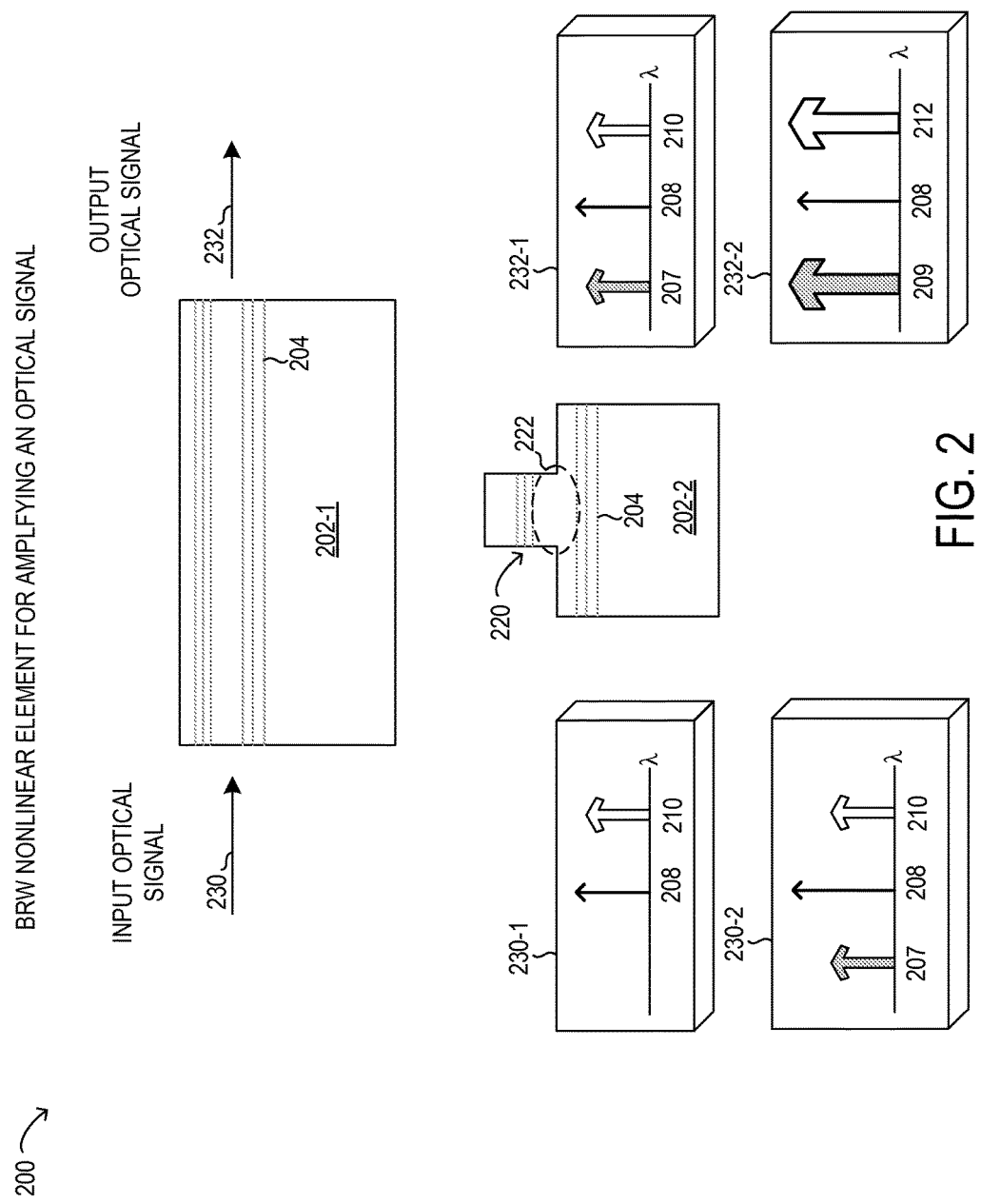
FIG. 2 is a block diagram of selected elements of an embodiment of Bragg reflection waveguide (BRW)

Referring now to FIG. 2, selected elements of an example embodiment of a BRW nonlinear element 200 to provide optical phase-sensitive amplification are depicted. As shown, BRW nonlinear element 200 includes BRW 202, which may represent selected elements of an embodiment of amplifier 108 (see FIG. 1). FIG. 2 is a schematic illustration and is not drawn to scale.

In FIG. 2, BRW 202 is shown in a side view as 202-1 and a facet view as 202-2. Within BRW 202, Bragg reflectors 204 are shown as various material layers, which may be engineered for different applications and lasing frequencies, as described above. In facet view 202-2 of BRW 202, ridge waveguide 220 and optical channel 222 where light passes through and is subject to non-linear interactions are shown.

In operation of BRW 202 input optical signal 230 may be introduced and subject to second order non-linear interaction, resulting in output optical signal 232. BRW 202 may be used for a first stage (corresponding to NLE idler stage 314-1) and for a second stage (corresponding to NLE gain stage 314-2) in the low noise PSA disclosed herein (see also FIGS. 3A, 3B). Accordingly, input optical signal 230 and output optical signal 232 are also shown as spectra 230-1, 230-2 and 232-1, 232-2 in FIG. 2 depicting the spectral composition for the first stage and the second stage. Specifically, spectra 230-1 shows the input for the first stage comprising optical pump 208 and optical signal 210, while spectra 232-1 show the output in which idler signal 207 has been added by BRW 202. Similarly, spectra 230-2 shows the input for the second stage comprising idler signal 207, optical pump 208 and optical signal 210, while spectra 232-2 shows the output in which idler signal 209 and optical signal 212 are amplified by BRW 202.

Figure 3A:
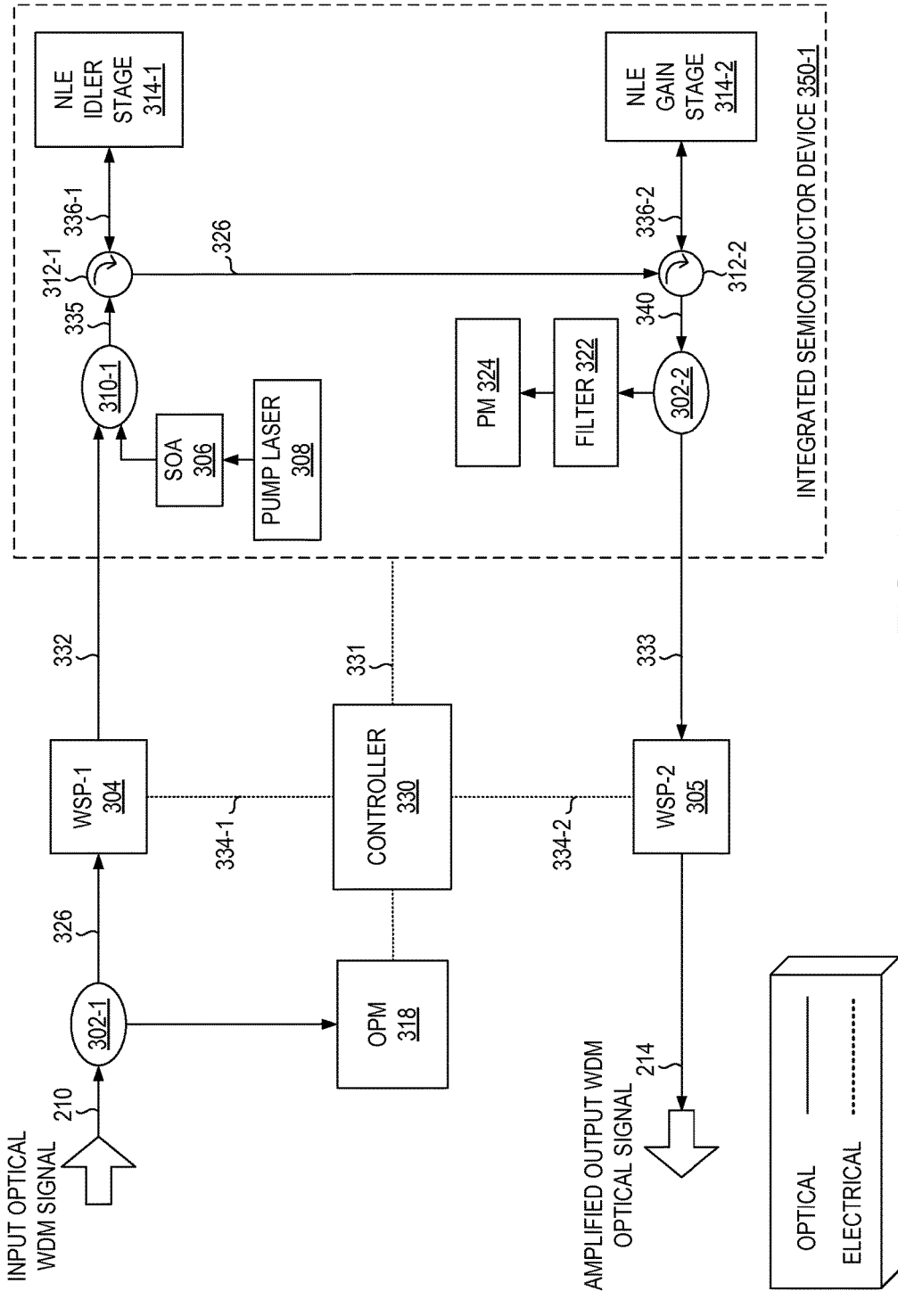
FIG. 3A is a block diagram of selected elements of an embodiment of an optical amplifier using BRWs.

Referring now to FIG. 3A, selected elements of an embodiment of low noise phase-sensitive optical amplifier 300-1 to provide low-noise optical phase-sensitive amplification using BRWs are depicted. In one embodiment, optical amplifier 300-1 may support dual-polarization modulation formats. As shown, optical amplifier 300-1 may represent selected elements of an embodiment of amplifier 108 (see FIG. 1). In FIG. 3A, optical amplifier 300-1 is shown in a schematic representation and is not drawn to scale. It is noted that, in different embodiments, optical amplifier 300-1 may be operated with additional or fewer elements. In FIG. 3A, optical amplifier 300-1 is described with respect to input optical WDM signal 210 representing N number of input channels. Although fixed grid WDM input optical signal 210 are shown herein for descriptive purposes, it is noted that other spectral channel arrangements, such as flex-grid channel spacing, may be practiced in particular embodiments.

Also in FIG. 3A, solid lines represent optical paths, while dashed lines represent electrical connections.

Optical amplifier 300-1 may amplify optical signals in optical network 100. Optical network 101 may include optical amplifier 300-1 in any suitable arrangement, such as in a transmission line between two optical components or in a ROADM. Furthermore, optical amplifier 300-1 may operate as a stand-alone device or as part of another piece of optical transmission equipment. As noted, input optical signal 210 may comprise N number of input channels. Amplified output optical signal 214 output by optical amplifier 300-1 correspondingly comprise N number of channels. It is noted that N may have any value greater than or equal to 1.

Optical amplifier 300-1 may include any suitable number and kind of components to perform optical signal amplification, as described herein. Optical amplifier 300-1 includes controller 330, which may include a processor coupled to a memory. In one embodiment, to perform optical signal amplification, optical amplifier 300-1 may include components for configuring optical amplifier 300-1 to monitor, adjust, and pre-compensate input signals and other system characteristics such as optical pump to adjust signal information such as phase, power and chromatic dispersion. In another embodiment, to perform optical signal amplification, optical amplifier 300-1 may include at least one BRW for performing second order nonlinear optical effects, such as optical parametric amplification (OPA). In a further embodiment, the OPA may be accomplished by passing the input signal, or filtered portions thereof, bi-directionally through a first non-linear optical element (NLE), such as a first BRW having second order optical nonlinearity. In yet another embodiment, passing such signals bi-directionally may include passing an X-polarization component signal in a given direction through the NLE and simultaneously passing a Y-polarization component signal in the opposite direction through the NLE.

Optical amplifier 300-1 may utilize two optical processing stages. In a first stage, optical amplifier 300-1 may generate an idler conjugate signal (also simply referred to as an "idler signal" or "idler) of input optical signal 210. In a second stage, optical amplifier 300-1 may conduct phase-sensitive OPA. Such OPA may transfer the energy from the optical pump to input optical signal 210 and to the idler signals.

Specifically, optical amplifier 300-1 may include means for generating pump laser signals, which may be used in an NLE idler stage 314-1 using a first BRW to create idler signals that are then added to the input signal. The idler signals may represent respective conjugate wavelengths to input optical signal 210. Optical amplifier 300-1 may then be configured to conduct OPA in an NLE gain stage 314-1 using a second BRW that amplifies input optical signal 210 based on the symmetric idler signals. The wavelengths of input optical signal 210 and idler signals may be equidistant (or nearly equidistant) from a wavelength of the optical pump. The equidistant or nearly equidistant wavelengths may include wavelengths that are, for example, perfectly equidistant or approximately equidistant such that overall performance may not be impacted significantly. Such approximately equidistant wavelengths may include wavelength differences between the idler signals and the optical pump that are approximately equal, or wavelength differences between the optical pump and input optical signal 210 that are approximately equal. In one embodiment, approximately equal wavelength differences may include wavelength differences that vary less than ten percent between the wavelength differences. Idler signals may include a phase that may be the inverse of the phase of input optical signal 210.

Input optical signal 210 may include an optical signal modulated through any suitable method, such as m-QAM or m-PSK. Input optical signal 210 may include dual-polarization components. Optical amplifier 300-1 may be configured to accept dual-polarization signals in any suitable manner. Optical amplifier 300-1 may be configured to split input optical signal 210 into X-polarization and Y-polarization components. Such split components may be processed independently. In one embodiment, a single NLE may be used for bi-directional signal conversion of the X-polarization and Y-polarization components. In another embodiment, a single NLE may be used for bi-directional non-degenerate OPA for phase-sensitive amplification of the X-polarization and Y-polarization components. In yet another embodiment, the X-polarization and Y-polarization components may share the elements of the first NLE idler stage and the second NLE gain stage, such that crosstalk and path mismatch are avoided between the two polarizations.

Optical amplifier 300-1 may include optical performance monitoring (OPM) 318, a controller 330, and WSPs, shown as WSP-1 304 and WSP-2 305, to dynamically control the operation of optical amplifier 300-1. Information regarding input optical signal 210, such as wavelength, power, residual chromatic dispersion, polarization mode dispersion, and OSNR may be monitored. Furthermore, information regarding the operation and output of the components of optical amplifier 300-1 may be monitored. According to monitored information, phase and power levels of optical signals at various portions of optical amplifier 300-1 may be dynamically changed, such as the phase and power levels of the output signal, optical pump, and idler signals.

Optical amplifier 300-1 may be configured to accept WDM signals. A first NLE idler stage 314-1 of optical amplifier 300-1 may be configured to generate idler signals for each WDM component of input optical signal 210. Furthermore, a second NLE gain stage 314-2 of optical amplifier 300-1 may be configured to perform OPA for each pair of signals within input optical signal 210 and a respective idler signal counterpart generated from the first NLE idler stage. When WDM signals are used in optical amplifier 300-1, each idler signal may be equidistant (or nearly equidistant) in wavelength from the optical pump with respect to a wavelength of a corresponding input signal in input optical signal 210.

Controller 330 may include a processor and memory media. The processor may comprise, for example a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in a memory to carry out some or all of the operation of optical amplifier 300-1. The memory may be configured in part or whole as application memory, system memory, or both. The memory may include any system, device, or apparatus configured to hold and/or house one or more memory modules. Each memory module may include any system, device or apparatus configured to retain program instructions and/or data for a period of time (e.g., computer-readable media). One or more portions or functionality of optical amplifier 300-1 may be implemented by the execution of instructions resident within the memory by the processor.

In FIG. 3A, input optical signal 210 are provided for optical amplification in the propagation direction shown. In certain embodiments, a Raman amplifier (not shown) may be used to provide a small gain for compensating certain kinds of dispersion compensation. Thus, a Raman pump (not shown) may provide optical energy at the input to optical amplifier 300-1 in a reverse direction to the propagation direction of input optical signal 210, which may also be referred to as "pre-emphasis stage".

Optical amplifier 300-1 may include a mechanism for accepting an input signal such as input optical signal 210. Input optical signal 210 may include a plurality of WDM channels, each of which may correspond to a different wavelength denoted by $\alpha_i$. Furthermore, each such channel may correspond to a different modulation format. For each channel, input optical signal 210 may include an X-polarization and a Y-polarization component (see also FIG. 6A).

At optical splitter 302-1, input optical signal 210 may be split and directed to WSP-1 304, which may be used, among other functionality, to select a desired group of channels among input optical signal 210, and OPM 318. For example, depending on an optical bandwidth supported by optical amplifier 300-1, a number of channels in input optical signal 210 may be limited for processing at WSP-1 304. In other embodiments, WSP-1 304 may pass all input optical signal 210 for processing. Thus, WSP-1 304 may select the desired channels of input optical signal 210 to be processed, for example, on a per-wavelength basis. WSP-1 304 may be implemented in any suitable manner, such as by active or passive configurable filters, array waveguides, electromechanical devices, or crystals. As shown, WSS 304 is communicatively coupled to controller 330 for control and monitoring purposes using an electrical connection 334-1. Controller 330 may be configured to adjust the operation of WSP-1 304 to, for example, select what portion of input optical signal 210 is to be amplified by optical amplifier 300-1. In addition, WSP-1 may perform certain operations on a per wavelength basis, such as chromatic dispersion compensation (CDC) and phase shifting (see also FIG. 4A).

As shown, optical amplifier 300-1 includes optical performance monitoring (OPM) 318, which receives input optical signal 210 and is communicatively coupled to controller 330 for control and monitoring purposes using an electrical connection. OPM 318 may monitor information regarding input optical signal 210, such as wavelength, power, residual chromatic dispersion, polarization mode dispersion, and OSNR. Controller 330 may receive monitoring information from OPM 318 and may adjust various other components accordingly.

As noted WSP-1 304 may include compensators for chromatic dispersion (CD), polarization-mode dispersion (PMD), or other types of dispersion compensation, as well as phase control using phase shifters. Controller 330 may be configured to adjust the operation of WSP-1 304 based upon, for example, the nature or kind of input optical signal 210, detected output of optical amplifier 300-1, or first optical signal 332 output by WSP-1 304 (see also FIG. 6A).

WSP-1 304 may send first optical signal 332 to coupler 310-1, which also receives the optical pump from pump laser 308. In various embodiments, pump laser 308 may include a tunable optical source, such as a tunable laser. Pump laser 308 may be communicatively coupled to controller 330. Pump laser 308 may be enhanced by semiconductor optical amplifier (SOA) 306 to a desired power level, for example. Controller 330 may be configured to adjust the wavelength, power, phase, or other aspects of the operation of pump laser 308 based upon, for example, the nature or kind of input optical signal 210, detected output of pump laser 308, or detected output of optical amplifier 300-1. In certain instances, pump laser 308 may include stimulated Brillouin scattering (SBS) suppression to compensate for density variations that may cause undesired scattering in an NLE. Furthermore, pump laser 308 may polarize the optical pump with respect to each of the dual-polarizations in input optical signal 210.

Figure 6A:
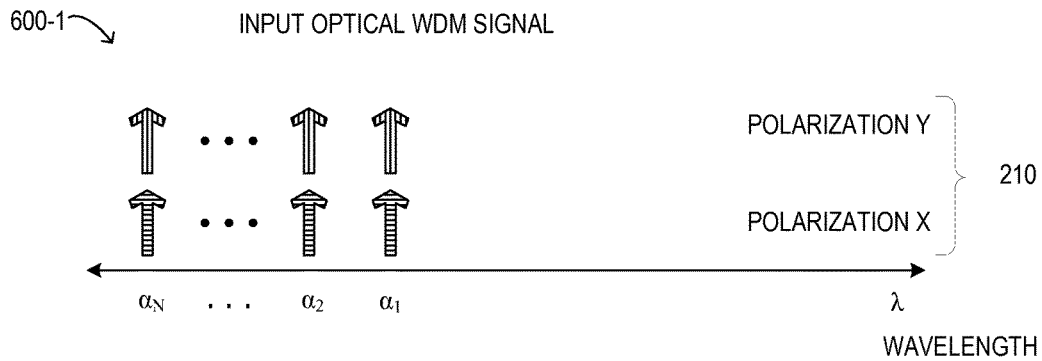
FIGS. 6A-6F are wavelength spectra of signals occurring in an optical amplifier using BRWs.
Figure 6B:
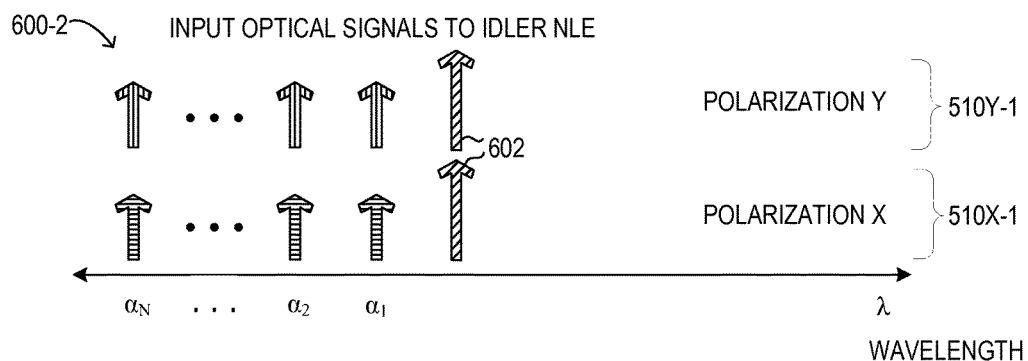

Coupler 310-1 may combine input optical signal 210 with the optical pump generated by pump laser 308 and provide a second optical signal 335 to optical circulator 312-1 (see also FIG. 6B). Optical circulator 312-1 may include any suitable mechanism for selective routing of inputs and outputs according to the present disclosure. For example, optical circulator 312-1 may include a plurality of sequentially identified optical input-output ports and may allow light to travel in only one direction. An optical signal entered into a first port will exit the second port, while a signal entering the second port will exit the third port. The sequential identification of the first, second, and third port, and thus the input-output behavior, may be schematically identified with a clockwise or counter-clockwise indicator. In the example of FIG. 3A, optical circulator 312-1 operates in clockwise fashion such that the input from coupler 310-1 is output via optical link 336-1 to NLE idler stage 314-1, and input from NLE idler stage 314-1 is output to circulator 312-2 via optical link 326.

At NLE idler stage 314-1, idler signals symmetric in wavelength about the optical pump to input optical signal 210 are added, as described in further detail below with respect to FIG. 5 (see also FIG. 6C). Based on what is selected by WSP-1 304 for input to optical amplifier 300-1, NLE idler stage 314-1 may add corresponding idler signals, as instructed by controller 330 via control link 331, as described in further detail below. NLE idler stage 314-1 may operate in a polarization insensitive manner by separating each polarization component and sending each polarization component in a different propagation direction through a BRW having second order optical nonlinearity. At the output of NLE idler stage 314-1, the amplitude of input optical signal 210 and idler signals will not yet be amplified, and may be relatively weak in amplitude, corresponding to an input level of optical amplifier 300-1.

Figure 6C:
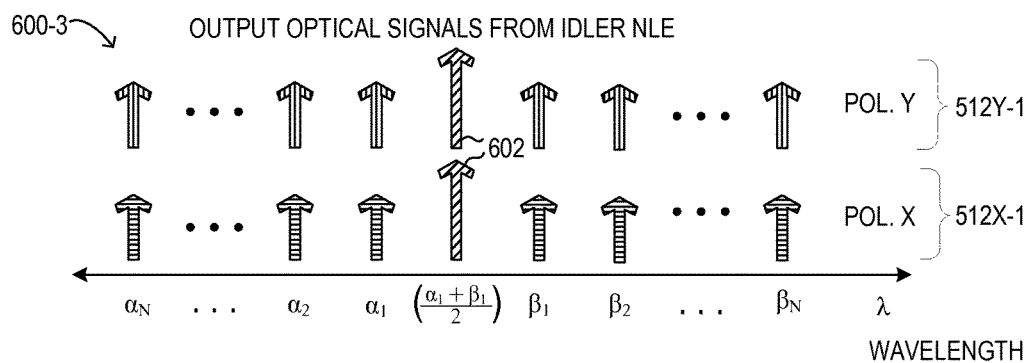
Figure 6D:
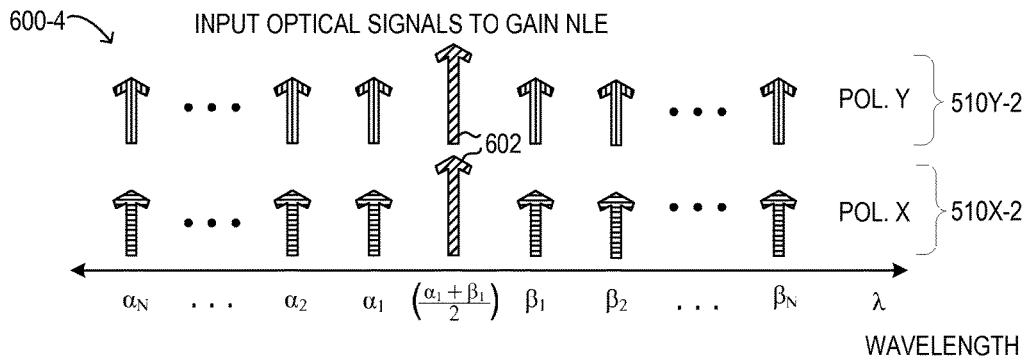

In FIG. 3A, optical link 326 sends a third optical signal that is the combined input optical signal 210, optical pump, and idler signals to circulator 312-2, which outputs the received optical signal to NLE gain stage 314-2 at optical link 336-2 (see also FIG. 6D). Circulator 312-2 receives the amplified optical signal from NLE gain stage 314-2 via optical link 336-2 and outputs a fourth optical signal including the amplified optical signal to optical link 340 (see also FIG. 6E). At optical splitter 302-2, the fourth optical signal is split with one portion being provided to filter 322, which may be a bandpass filter to isolate individual WDM channels for measurement by power monitoring (PM) 324. PM 324 may then output an indication of optical power for each respective channel in the fourth optical signal to controller 330 via control link 331. Optical splitter 302-2 also outputs the amplified optical signal as the fourth optical signal to WSP-2 305 via optical link 333, which may select wavelengths corresponding to input optical signal 210 for output and may block out other undesired wavelengths, such as the optical pump and the idler signals to generate output signals 214 (see also FIGS. 4B and 6F). In addition, WSP-2 305 may perform power attenuation on each optical channel individually for a desired optical output power level, or to equalize power levels among all channels in output signals 214.

As shown in FIG. 3A, various elements on optical amplifier 300-1 are implemented as an integrated semiconductor device 350-1. Integrated semiconductor device 350-1 may represent a solid state device having various optical, optoelectronic, and electronic components formed thereon using semiconductor manufacturing technology. Integrated semiconductor device 350-1 may be highly miniaturized and may be implemented as a microchip. As shown, integrated semiconductor device 350-1 may have input optical link 332 and output optical link 333. Integrated semiconductor device 350-1 may also be in electrical communication with controller 330 via control link 331, which may be propagated to various elements within integrated semiconductor device 350-1, as described herein, but are omitted from FIG. 3A for descriptive clarity.

Figure 3B:
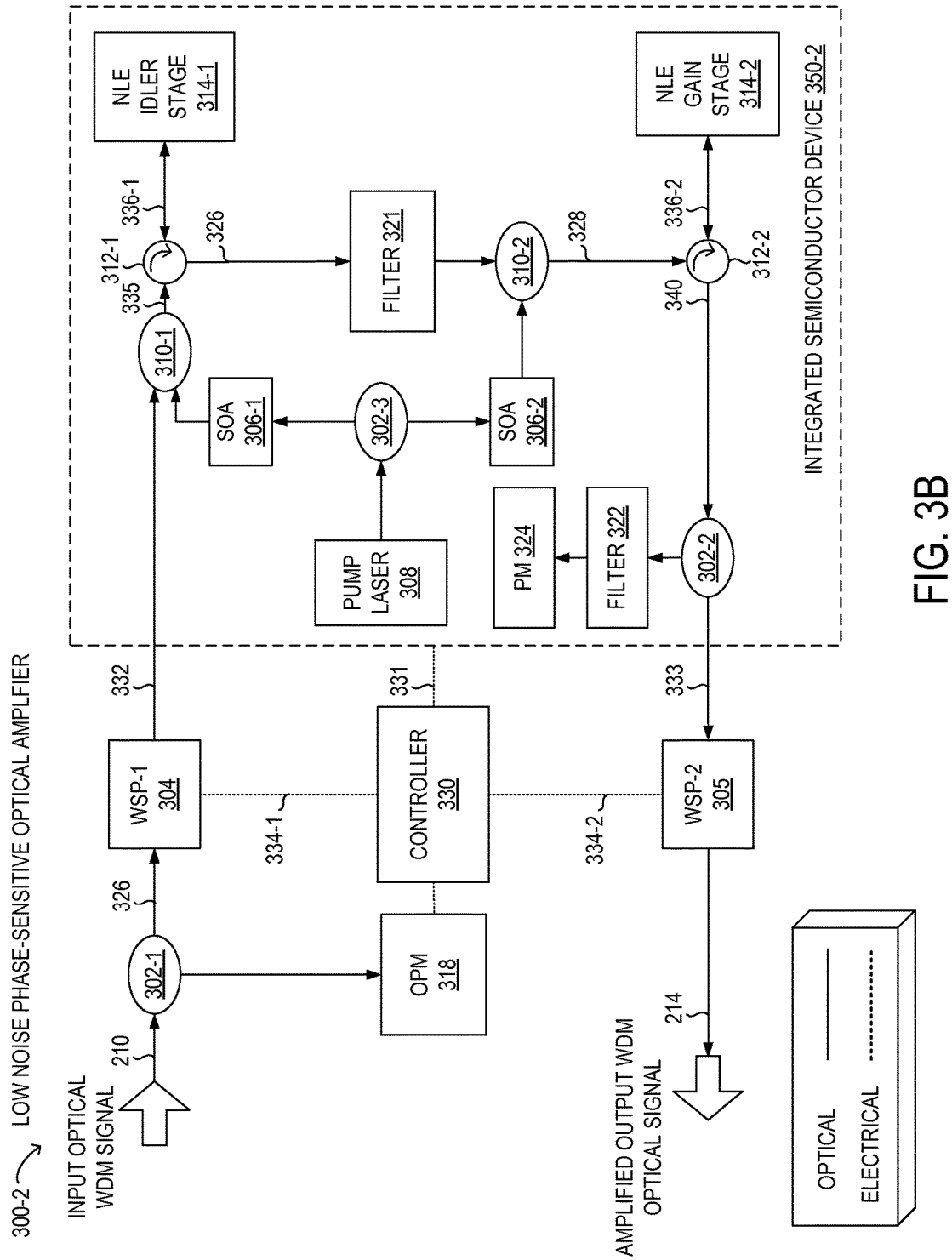
FIG. 3B is a block diagram of selected elements of an embodiment of an optical amplifier using BRWs.

Referring now to FIG. 3B, selected elements of an embodiment of low noise phase-sensitive optical amplifier 300-2 to provide low-noise optical phase-sensitive amplification using BRWs are depicted. In one embodiment, optical amplifier 300-2 may support dual-polarization modulation formats. As shown, optical amplifier 300-2 may represent selected elements of an embodiment of amplifier 108 (see FIG. 1). In FIG. 3B, optical amplifier 300-2 is shown in a schematic representation and is not drawn to scale. It is noted that, in different embodiments, optical amplifier 300-2 may be operated with additional or fewer elements. In FIG. 3B, optical amplifier 300-2 is described with respect to input optical WDM signal 210 representing N number of input channels. Although fixed grid WDM input optical signal 210 are shown herein for descriptive purposes, it is noted that other spectral channel arrangements, such as flex-grid channel spacing, may be practiced in particular embodiments. Also in FIG. 3B, solid lines represent optical paths, while dashed lines represent electrical connections.

In FIG. 3B, optical amplifier 300-2 operates in a similar manner to optical amplifier 300-1 in FIG. 3A, where like numbered elements are described above. In optical amplifier 300-2, however, pump laser 308 is split at optical splitter 302-1 and is independently directed to SOA 306-1 and SOA 306-2, respectively. From SOA 306-1, the optical pump is combined with at least certain channels in input optical signal 210 at coupler 310-1 to generate the first optical signal at optical link 335. It is noted that some undesirable differences in amplitude between input optical signal 210 and idler signals may be present at the output of NLE idler stage 314-1. Also, the optical pump may be adulterated to a degree due to optical wavelength interaction or mixing between input optical signal 210 wavelengths and idler signal wavelengths when emerging from NLE idler stage 314-1. Therefore, in optical amplifier 300-2, filter 321 may filter out the optical pump from optical link 326. From SOA 306-2, the optical pump, which has not been potentially adulterated at NLE idler stage 314-1, is coupled to the output from filter 321 at coupler 310-2 to generate the third optical signal at optical link 328.

As shown in FIG. 3B, various elements on optical amplifier 300-2 are implemented as an integrated semiconductor device 350-2. Integrated semiconductor device 350-2 may represent a solid state device having various optical, optoelectronic, and electronic components formed thereon using semiconductor manufacturing technology. Integrated semiconductor device 350-2 may be highly miniaturized and may be implemented as a microchip. As shown, integrated semiconductor device 350-2 may have input optical link 332 and output optical link 333. Integrated semiconductor device 350-2 may also be in electrical communication with controller 330 via control link 331, which may be propagated to various elements within integrated semiconductor device 350-2, as described herein, but are omitted from FIG. 3B for descriptive clarity.

Figure 4A:
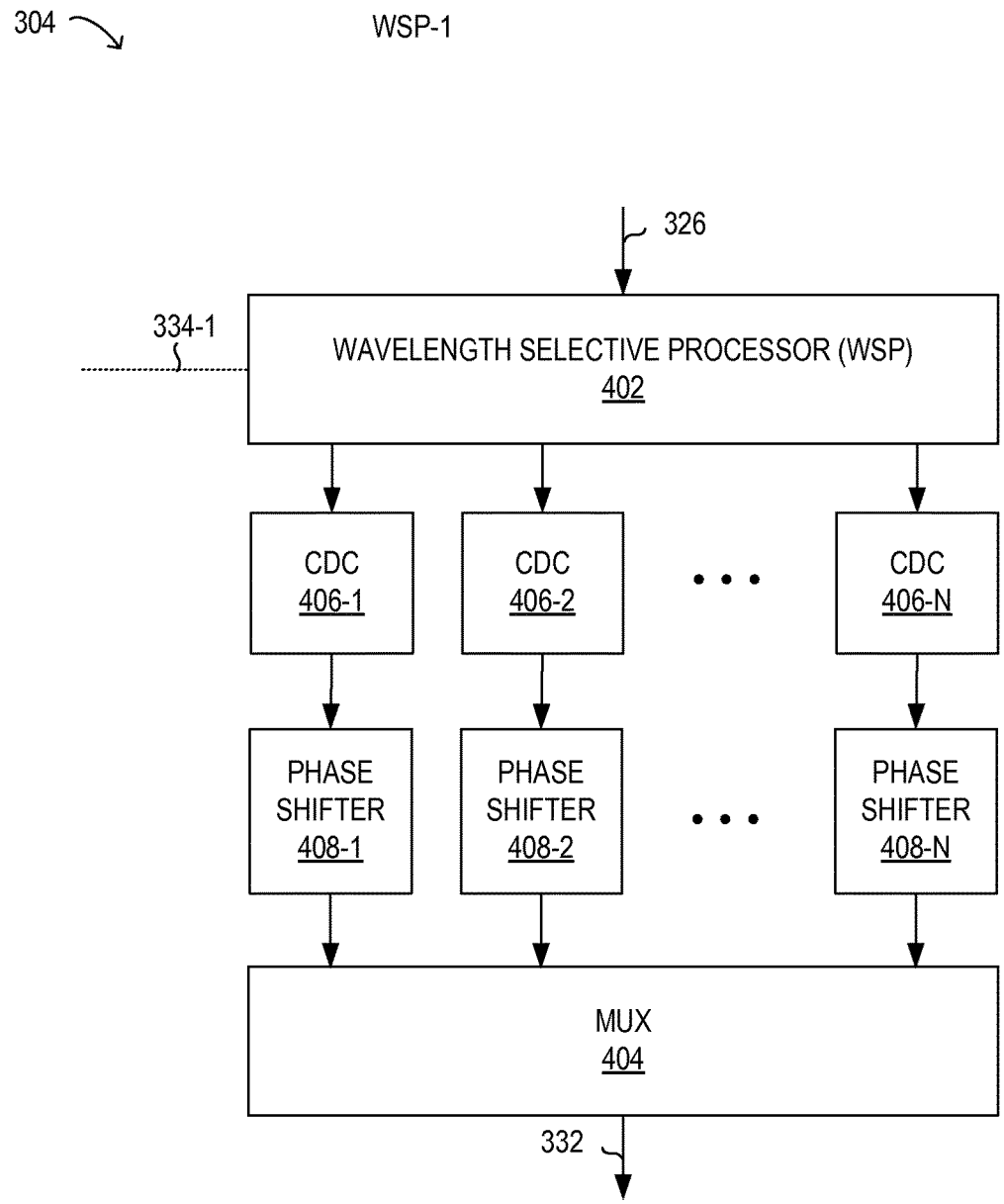
FIG. 4A is a block diagram of selected elements of an embodiment of a wavelength-specific processing element.
Figure 4A:
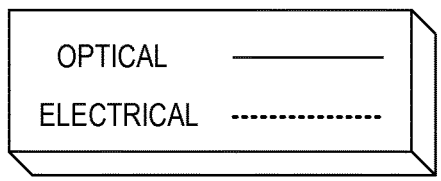

Referring now to FIG. 4A, selected elements of an embodiment of WSP-1 304 in optical amplifier 300 are depicted (see also FIGS. 3A and 3B). As shown, WSP-1 304 receives the wavelengths corresponding to input optical signal 210 via optical link 326 (see also FIG. 6C) at a WSP 402. WSP 402 may further receive instructions from controller 330 via control link 334-1. In WSP-1 304, WSP 402 may perform amplitude equalization for the wavelengths corresponding to input optical signal 210. For example, WSP 402 may equalize all wavelengths for input optical signal 210 to each other. Then, WSP 402 may demultiplex N optical signals to perform wavelength-specific processing. The N-number of optical signals may correspond to the wavelength channels in input optical signal 210. In some embodiments, WSP 402 may selectively omit or remove certain wavelength channels in input optical signal 210.

Subsequent to WSP 402, each wavelength may be individually processed with CDC 406 and phase shifter 408 to achieve a desired phase, as determined by controller 330 via control link 334-1. CDC 406 may perform chromatic dispersion correction on each wavelength channel individually, such that CDC 406-1 corrects a first channel, CDC 406-2 corrects a second channel, and so on, up to CDC 406-N. Phase shifter 408 may be an optical phase shifter that receives a desired phase shift as input and applies the phase shift irrespective of wavelength. The desired phase shift may be received via control link 334-1. Thus, phase shifter 408-1 may correspond to a first input channel, phase shifter 408-2 may correspond to a second input channel, and so on, up to phase shifter 408-N corresponding to an Nth input channel. Then, MUX 404 may multiplex the N input channel-idler signal pairs and output the combined optical signal via optical link 332.

Figure 4B:
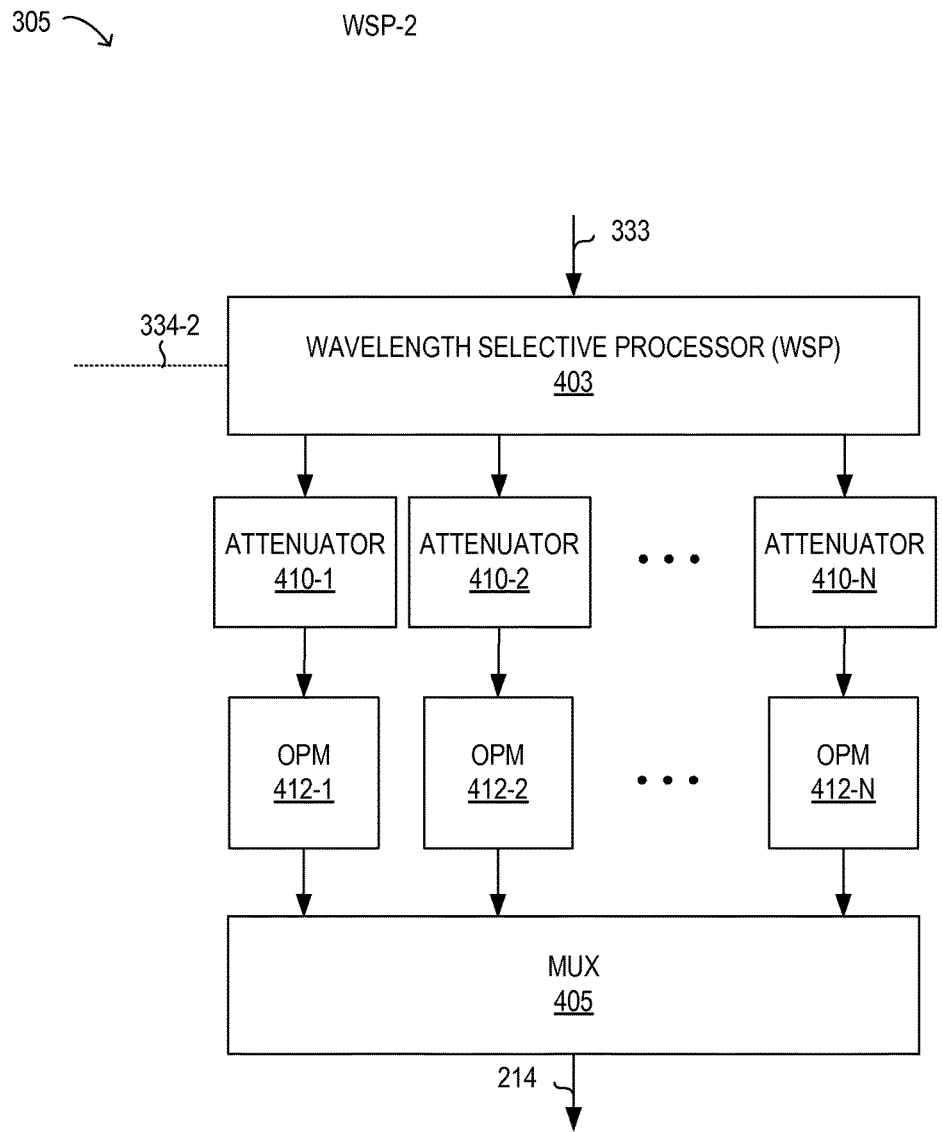
FIG. 4B is a block diagram of selected elements of an embodiment of a wavelength-specific processing element.

Referring now to FIG. 4B, selected elements of an embodiment of WSP-2 305 in optical amplifier 300 are depicted (see also FIGS. 3A and 3B). As shown, WSP-2 305 receives the wavelengths corresponding to the fourth optical signal via optical link 333 (see also FIG. 6E) at a WSP 403. WSP 403 may further receive instructions from controller 330 via control link 334-2. WSP 403 may eliminate the optical pump and the idler signals from the fourth optical signal (see also FIG. 6F). Then, WSP 403 may demultiplex N optical signals to perform wavelength-specific processing. The N-number of optical signals may correspond to the wavelength channels in the third optical signal.

Subsequent to WSP 403, each wavelength may be individually processed with attenuator 410 and OPM 412-1 to achieve a desired power level, as determined by controller 330 via control link 334-2. Attenuator 410 may perform power attenuation on each wavelength channel individually, such that attenuator 410-1 sets power of a first channel, attenuator 410-2 sets power for a second channel, and so on, up to attenuator 410-N. OPM 412 may be an optical power monitor that measures the optical power output by attenuator 410. Thus, OPM 412-1 may correspond to a first input channel, OPM 412-2 may correspond to a second input channel, and so on, up to OPM 412-N corresponding to an Nth input channel. Then, MUX 405 may multiplex the N input channels and output the combined optical signal via optical link 214.

Figure 5:
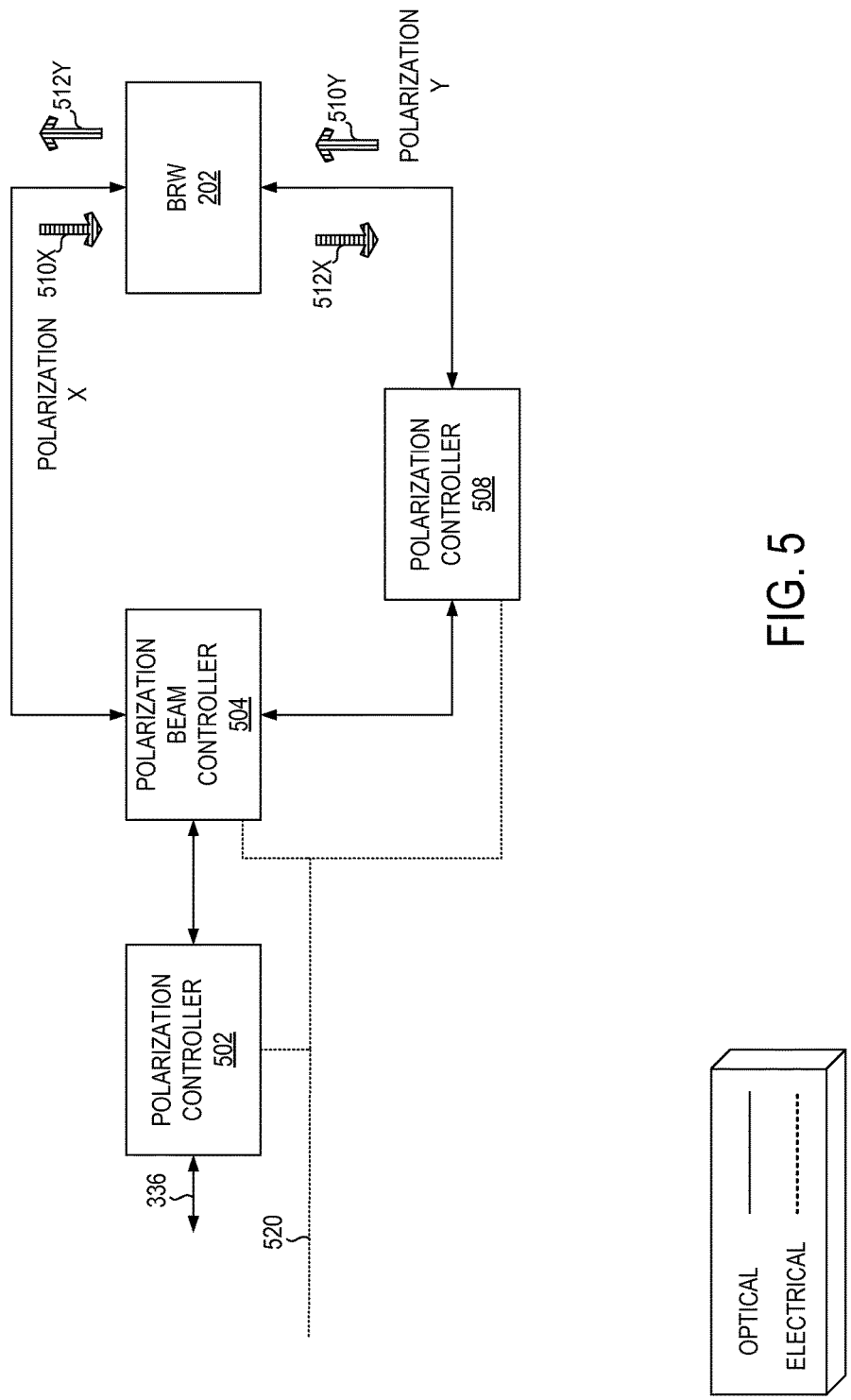
FIG. 5 is a block diagram of selected elements of an embodiment of a non-linear element stage using a BRW.

Referring now to FIG. 5, selected elements of an embodiment of NLE stage 314 are depicted. As shown, NLE stage 314 may represent an embodiment of NLE idler stage 314-1 or NLE gain stage 314-2 (see also FIGS. 3A and 3B). Although the optical functionality of NLE idler stage 314-1 and NLE gain stage 314-2 are different, NLE stage 314 may represent a generalized component for performing optical mixing on dual-polarized optical signals. Thus, the structure depicted in NLE stage 314 may be used to generate the idler signal in NLE idler stage 314-1. Furthermore, the structure depicted in NLE stage 314 may be used for phase-sensitive amplification in NLE gain stage 314-2 using OPA after idler signals are present. It is noted that different specific components and other modifications may be made to NLE stage 314 for particular uses in different applications of optical mixing.

In FIG. 5, NLE stage 314 includes polarization controllers 502 and 508, which may adjust the X-polarization and Y-polarization components of input signals on optical link 336 with respect to polarization beam controller 504. In the case of NLE idler stage 314-1, the polarization may be adjusted to maximize or increase the effects of idler signal generation by BRW 202. Such adjustments may include a polarization shifting of the X-polarization and Y-polarization components. Furthermore, polarization controllers 502 and 508 may be configured to adjust such components after an idler signal has been generated for the components. Polarization controllers 502 and 508 may be implemented in any suitable manner to perform such adjustments. Polarization controllers 502 and 508 may be communicatively coupled to controller 330 via control link 520, which may connect to control link 331 at integrated semiconductor device 350. Controller 330 may be configured to adjust the operation of polarization controllers 502 and 508. Such adjustments may be based upon, for example, the nature or kind of input optical signal 210, detected output of polarization controllers 502 and 508, or detected output of optical amplifier 300.

Polarization controller 502 may perform adjustments on the X-polarization and Y-polarization components and output the results to polarization beam controller 504. Polarization beam controller 504 may split an input optical signal according to X-polarization and Y-polarization components, and may combine into an output optical signal X-polarization and Y-polarization components that were previously split. For example, input optical signal 210 may include an X-polarization component and a Y-polarization component. Thus, polarization beam controller 504 may output the X-polarization component of the combination of input optical signal 210 and the optical pump and to output the Y-polarization component of the combination of input optical signal 210 and the optical pump. Polarization beam controller 504 may output each polarization bi-directionally to BRW 202 for signal conversion. For example, X-polarization component 510X may be provided to BRW 202 in the clockwise circuit loop in FIG. 6 and Y-polarization component 510Y may be provided to BRW 202 in the counter-clockwise circuit loop. Then, after second order nonlinear optical interaction within BRW 202, X-polarization component 512X emerges from BRW 202 in the clockwise direction and Y-polarization component 512Y emerges in the counter-clockwise direction. Polarization beam controller 504 may be implemented in any suitable manner for splitting its input signals into X-polarization and Y-polarization components. Polarization beam controller 504 may be communicatively coupled to controller 330. Controller 330 may adjust the operation of polarization beam controller 504. Such adjustments may be based upon, for example, the nature or kind of input optical signal 210, detected output of optical amplifier 300, or detected output of polarization beam controller 504.

Polarization controller 508 may receive optical signals from polarization beam controller 214 or BRW 202 and adjust the polarization components of the optical signals and output the adjusted optical signals to BRW 202 or polarization beam controller 504, respectively. Further, polarization beam controller 504 may combine X-polarization component 512X and Y-polarization component 512Y after passing bi-directionally through BRW 202. Polarization beam controller 504 may receive X-polarization component 512X from polarization controller 508. Furthermore, polarization beam controller 504 may output the combination of X-polarization component 512X and Y-polarization component 512Y to polarization controller 502.

BRW 202 may bi-directionally provide signal conversion for optical signals passing through BRW 202. Such signal conversion may be performed on signals passing simultaneously through optical BRW 202 in each direction, such as X-polarization component 510X and Y-polarization component 510Y from polarization beam controller 504.

BRW 202 may provide optical signal conversion based upon the nature of input signals. In the case of NLE idler stage 314-1, the input signals may include the combination of input optical signal 210 and the optical pump from pump laser 308, where BRW 202 may cause an idler signal to be added to the combination. The spectral properties of the idler signal are described in further detail with respect to FIG. 7C. When input optical signal 210 includes multiple WDM components, BRW 202 may generate an idler signal for each such WDM component. Each idler signal and the corresponding WDM component may be equidistant, or nearly equidistant, from the optical pump in terms of wavelength. Thus, the WDM components of input signal 202 and the corresponding idler signals may be symmetric, or nearly symmetric, around the optical pump with respect to wavelength. In the case of NLE gain stage 314-2, BRW 202 may bi-directionally amplify signals using phase-sensitive OPA. Such signals may include both input optical signal 210 and corresponding idler signals. Such bi-directional amplification may be performed on signals passing simultaneously through BRW 202 in each direction, as described above with respect to NLE idler stage 314-1. The OPA performed by BRW 202 may utilize the equidistant, or nearly equidistant, arrangement of input optical signal 210 and the idler signals around the optical pump. Furthermore, the OPA performed by BRW 202 may utilize the performance of the idler signals as conjugate signals to input optical signal 210. When input optical signal 210 includes WDM signals, BRW 202 may amplify the range of WDM signals and the range of the idler signals corresponding to the WDM signals.

By performing separate processing of X-polarization and Y-polarization components using NLE stage 314, optical amplifier 300 may avoid crosstalk or path mismatch between the components. Further, by performing the processing bi-directionally using NLE stage 314, optical amplifier 300 may achieve hardware efficiency by lessening the need for additional optical NLEs.

Referring now to FIGS. 6A through 6F, selected elements of embodiments of wavelength spectra 600 are depicted. The wavelength spectra 600 depict amplitude and polarization versus wavelength of various optical signals occurring in optical amplifier 300, as will be described in further detail. Each input channel is shown as an arrow whose relative height indicates a signal amplitude and whose position indicates a wavelength. A shading and absolute position of each arrow may correspond to a given polarization, as indicated in each respective figure and described in detail below. It is noted that wavelength spectra 600 are shown with arbitrary axes for schematic representation and are not drawn to scale.

In FIG. 6A, wavelength spectra 600-1 depicts a general spectrum for input optical WDM signals to optical amplifier 300. The signals depicted in wavelength spectra 600-1 represent input optical signal 210, for example, at an input to coupler 310-1. The WDM signals are shown at wavelengths $\alpha_1$, $\alpha_2$, and so on, up to $\alpha_N$, where N is an integer greater than or equal to 1. It is noted that a wavelength difference $\alpha_n - \alpha_{n-1}$ for any n={1 ... N} may be constant or substantially constant. As shown, the input optical WDM signals have dual-polarization, shown as X-polarization component and Y-polarization component which are combined for each channel in input optical signal 210.

In FIG. 6B, wavelength spectra 600-2 depicts a general spectrum for input optical signals to the BRW (optical input at NLE idler stage 314-1) in optical amplifier 300. The signals depicted in wavelength spectra 600-2 represent input optical signal 210 that include input channels at wavelengths $\alpha_1$ to $\alpha_N$ with added optical pump 602. It is noted that optical pump 602 may be polarized at 45° such that a relative polarization angle of optical pump 602 with respect to X-polarization component 610X-1 and Y-polarization component 610Y-1 is equal.

In FIG. 6C, wavelength spectra 600-3 depicts a general spectrum for output optical signals from the BRW (optical output from NLE idler stage 314-1) in optical amplifier 300. The signals depicted in wavelength spectra 600-3 represent input optical signal 210 that include input channels at wavelengths $\alpha_1$ to $\alpha_N$ with added optical pump 602. Additionally, in wavelength spectra 600-3, idler signals have been added at wavelengths $\beta_1$, $\beta_2$, and so on, up to $\beta_N$. The wavelength spacing between successive idler signals may correspond to the wavelength spacing between corresponding input signals 210. In other words, the idler signals may be symmetrical about optical pump 602 to input signals 210. The spectral position of optical pump 602 may be given by $(\alpha_1 + \beta_1)/2$. The signals in wavelength spectra 600-3 include X-polarization component 612X-1 and Y-polarization component 612Y-1.

In FIG. 6D, wavelength spectra 600-4 depicts a general spectrum for input optical signals to the BRW (optical input to NLE gain stage 314-2) in optical amplifier 300. The signals depicted in wavelength spectra 600-4 represent input optical signal 210 that include input channels at wavelengths $\alpha_1$ to $\alpha_N$ with added optical pump 602. Additionally, in wavelength spectra 600-4, idler signals are included at wavelengths $\beta_1$ to $\beta_N$. Thus, in certain embodiments, wavelength spectra 600-3 and 600-4 may be equivalent. In certain embodiments, wavelength spectra 600-4 may show uniform amplitude according to an equalization that is performed. The signals in wavelength spectra 600-4 include X-polarization component 610X-2 and Y-polarization component 610Y-2.

Figure 6E:
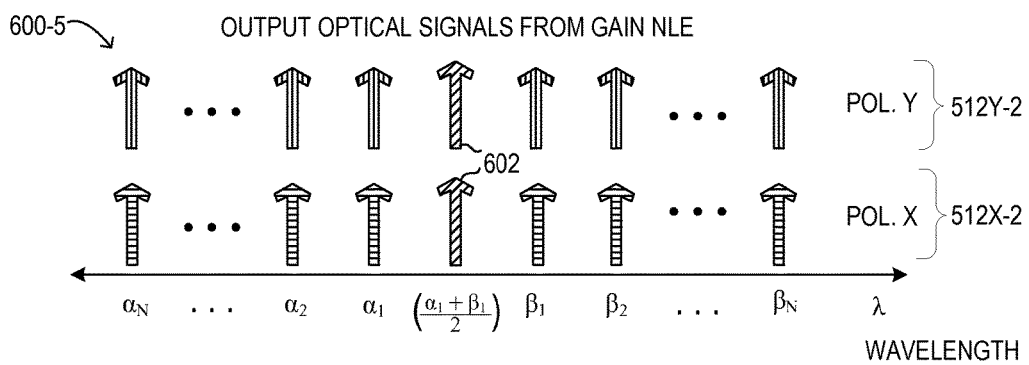

In FIG. 6E, wavelength spectra 600-5 depicts a general spectrum for output optical signals from the BRW (optical output from NLE gain stage 314-2) in optical amplifier 300. The signals depicted in wavelength spectra 600-5 represent input optical signal 210 that include input channels at wavelengths $\alpha_1$ to $\alpha_N$ with added optical pump 602. Additionally, in wavelength spectra 600-5, idler signals are present at wavelengths $\beta_1$ to $\beta_N$. As shown, wavelength spectra 600-5 may an amplitude reduction for optical pump 602 with an increase in amplitude of input signals 210 and the idler signals, according to a phase-sensitive amplification that is performed at NLE gain stage 314-2. The signals in wavelength spectra 600-5 include X-polarization component 612X-2 and Y-polarization component 612Y-2.

Figure 6F:
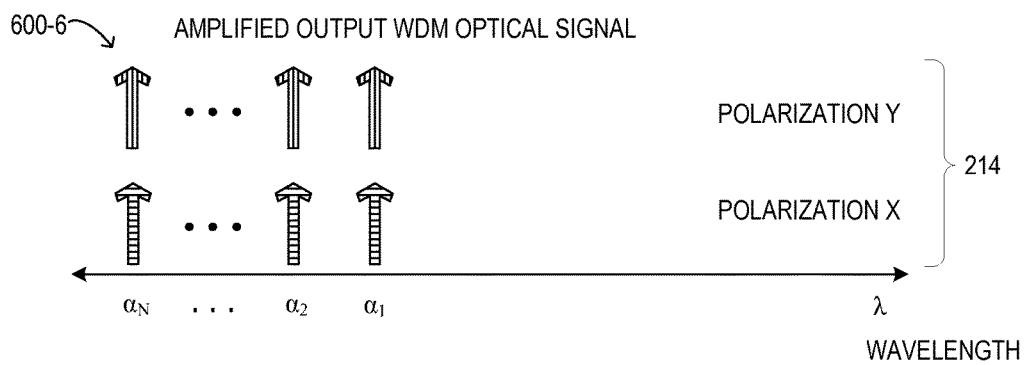

In FIG. 6F, wavelength spectra 600-6 depicts a general spectrum for amplified output WDM optical signals from the BRW (optical output from NLE gain stage 314-2) in optical amplifier 300. The signals depicted in wavelength spectra 600-6 represent amplified channels 214 that include input channels at wavelengths $\alpha_1$ to $\alpha_N$ without optical pump 602 or idler signals. The amplitude of the WDM signals in wavelength spectra 600-6 is greater than in wavelength spectra 600-1.

Figure 7:
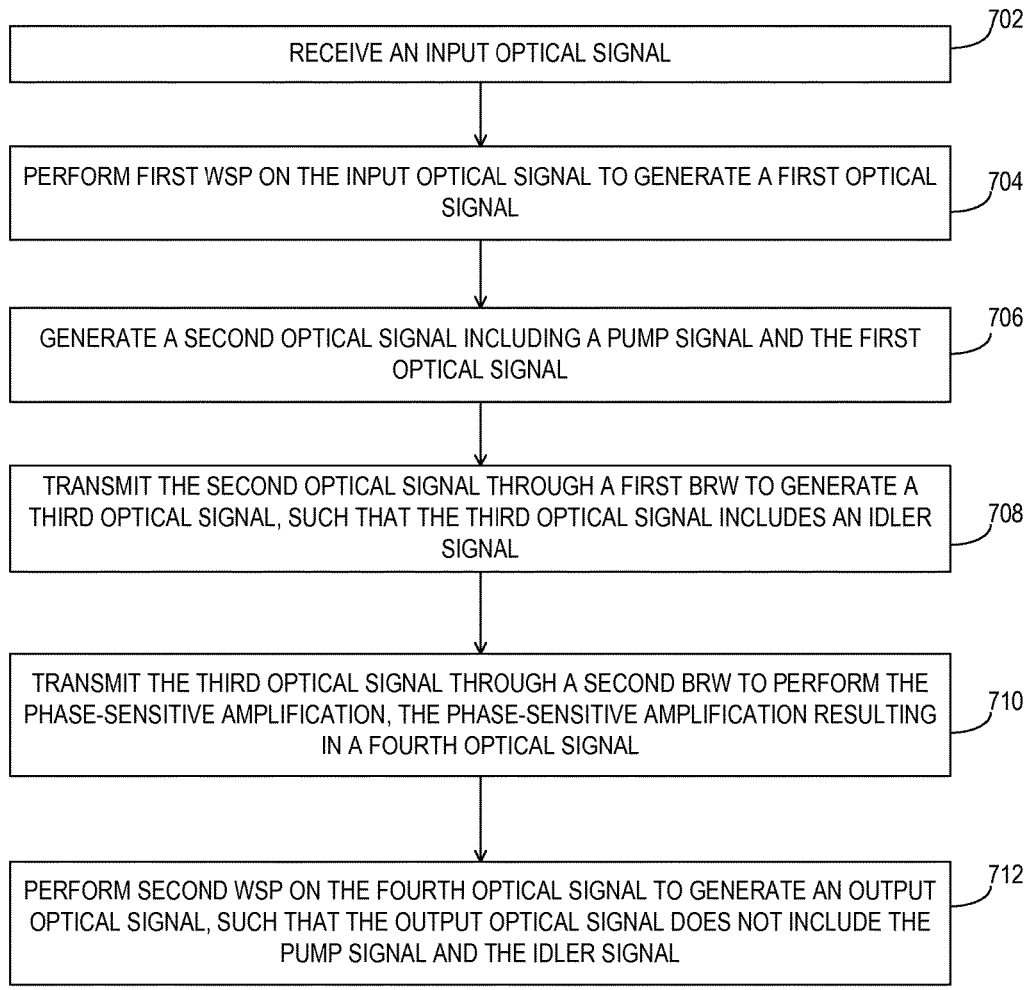
FIG. 7 is a flow diagram of selected elements of an embodiment of a method for low noise phase-sensitive optical amplification using BRWs.

Referring now to FIG. 7, a block diagram of selected elements of an embodiment of method 700 for low noise phase-sensitive optical amplification using BRWs, as described herein, is depicted in flowchart form. Method 700 may be performed using optical amplifier 300. It is noted that certain operations described in method 700 may be optional or may be rearranged in different embodiments.

Method 700 may begin at step 702 by receiving an input optical signal. At step 704, first wavelength-specific processing (WSP-1) may be performed on the input optical signal to generate a first optical signal. At step 706, a second optical signal may be generated including a pump signal and the first optical signal. At step 708, the second optical signal may be transmitted through a first BRW to generate a third optical signal, such that the third optical signal includes an idler signal. At step 710, the third optical signal may be transmitted through a second BRW to perform the phase-sensitive amplification, the phase-sensitive amplification resulting in a fourth optical signal. At step 712, second wavelength-specific processing (WSP-2) may be performed on the fourth optical signal to generate an output optical signal, such that the output optical signal does not include the pump signal and the idler signal.

As disclosed herein, methods and systems for amplifying optical signals include generating idler signals for input signals using an optical pump at a first Bragg reflection waveguide (BRW) having second order optical nonlinearity. Phase and amplitude regulation is performed using the output from the first BRW. Optical power monitoring of the input signals may be used for power equalization. The phase-sensitive amplified signal is generated at a second BRW using the optical pump. Optical power monitoring of the input signals may be used for power equalization.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for amplifying optical signals, comprising:
receiving a first optical signal for amplification;
generating a second optical signal including an optical pump and the first optical signal;
transmitting the second optical signal through a first Bragg reflection waveguide (BRW) having second order optical nonlinearity to generate a third optical signal, wherein the third optical signal includes an idler signal; and transmitting the third optical signal through a second BRW having second order optical nonlinearity to perform phase-sensitive amplification resulting in a fourth optical signal.

2. The method of claim 1, wherein the first optical signal includes a plurality of wavelength channels that are wavelength division multiplexed.

3. The method of claim 2, wherein each of the wavelength channels are modulated using orthogonal dual-polarization modulation including an X-polarization component and a Y-polarization component.

4. The method of claim 2, wherein the wavelength channels are modulated using at least one of: phase-shift keying (PSK); frequency-shift keying (FSK); amplitude-shift keying (ASK); and quadrature amplitude modulation (QAM).

5. The method of claim 2, further comprising:
performing wavelength-selective processing on the fourth optical signal to generate an output optical signal that does not include the optical pump and the idler signal.

6. The method of claim 5, wherein performing the wavelength-selective processing further comprises:
attenuating a power level for at least one of the wavelength channels in the fourth optical signal.

7. The method of claim 1, wherein the optical pump, the first BRW, and the second BRW are included in an integrated semiconductor device.

8. An optical amplifier, comprising:
a pump source to generate an optical pump;
a coupler to combine the optical pump with a first optical signal to generate a second optical signal;
a first non-linear element (NLE) stage to generate a third optical signal from the second optical signal, the third optical signal including an idler signal, the first NLE stage including a first Bragg reflection waveguide (BRW) having second order optical nonlinearity;
a second NLE stage to generate a fourth optical signal from the third optical signal, the second NLE stage performing phase-sensitive amplification on the third optical signal and including a second BRW having second order optical nonlinearity.

9. The optical amplifier of claim 8, wherein the first optical signal includes a plurality of wavelength channels that are wavelength division multiplexed.

10. The optical amplifier of claim 9, wherein each of the wavelength channels are modulated using orthogonal dual-polarization modulation including an X-polarization component and a Y-polarization component.

11. The optical amplifier of claim 9, wherein the wavelength channels are modulated using at least one of: phase-shift keying (PSK); frequency-shift keying (FSK); amplitude-shift keying (ASK); and quadrature amplitude modulation (QAM).

12. The optical amplifier of claim 8, wherein the optical pump, the first BRW, and the second BRW are included in an integrated semiconductor device.

13. The optical amplifier of claim 8, further comprising:
a wavelength-specific processing element to perform wavelength-selective processing on the fourth optical signal to generate an output optical signal that does not include the optical pump and the idler signal, the wavelength-specific processing including enabling attenuation of a power level for at least one of the wavelength channels in the fourth optical signal.

14. An optical communication system comprising:
a transmitter to transmit an optical signal over an optical signal transmission path;
a receiver to receive the optical signal from the optical signal transmission path; and
an optical amplifier in the optical signal transmission path, the optical amplifier further comprising:
a pump source to generate an optical pump;
a coupler to combine the optical pump with a first optical signal to generate a second optical signal, the first optical signal including at least a portion of the optical signal;
a first non-linear element (NLE) stage to generate a third optical signal from the second optical signal, the third optical signal including an idler signal, the first NLE stage including a first Bragg reflection waveguide (BRW) having second order optical nonlinearity;
a second NLE stage to generate a fourth optical signal from the third optical signal, the second NLE stage performing phase-sensitive amplification on the third optical signal and including a second BRW having second order optical nonlinearity.

15. The optical communication system of claim 14, wherein the first optical signal includes a plurality of wavelength channels that are wavelength division multiplexed.

16. The optical communication system of claim 15, wherein each of the wavelength channels are modulated using orthogonal dual-polarization modulation including an X-polarization component and a Y-polarization component.

17. The optical communication system of claim 15, wherein the wavelength channels are modulated using at least one of: phase-shift keying (PSK); frequency-shift keying (FSK); amplitude-shift keying (ASK); and quadrature amplitude modulation (QAM).

18. The optical communication system of claim 14, wherein the optical pump, the first BRW, and the second BRW are included in an integrated semiconductor device.

19. The optical communication system of claim 14, further comprising:
a wavelength-specific processing element to perform wavelength-selective processing on the fourth optical signal to generate an output optical signal that does not include the optical pump and the idler signal, the wavelength-specific processing including enabling attenuation of a power level for at least one of the wavelength channels in the fourth optical signal.

* * * * *